May 31, 1949.
G. A. RING
2,471,544
MEANS FOR CONNECTING MOORING CABLES
TO ROTARY WINGED AIRCRAFT
Filed March 30, 1945
3 Sheets-Sheet 1
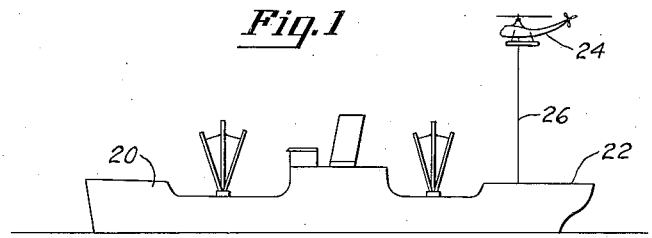
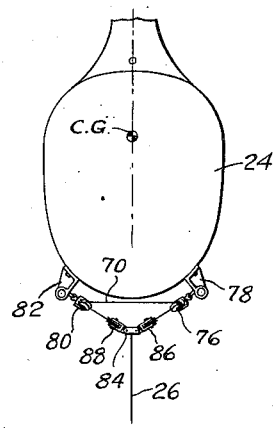
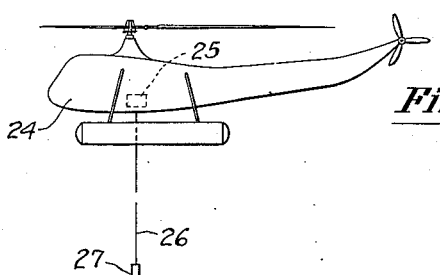
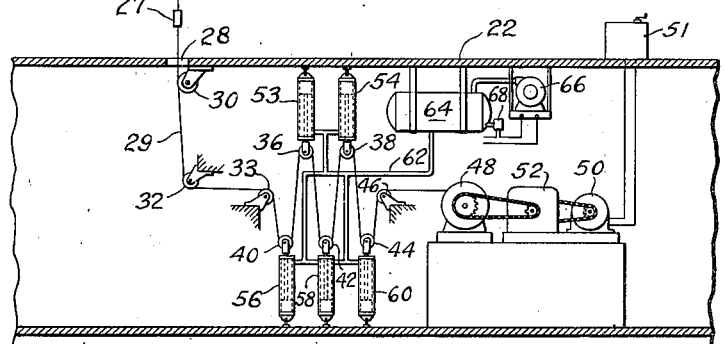
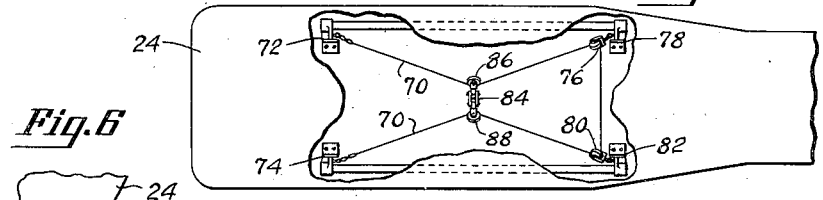
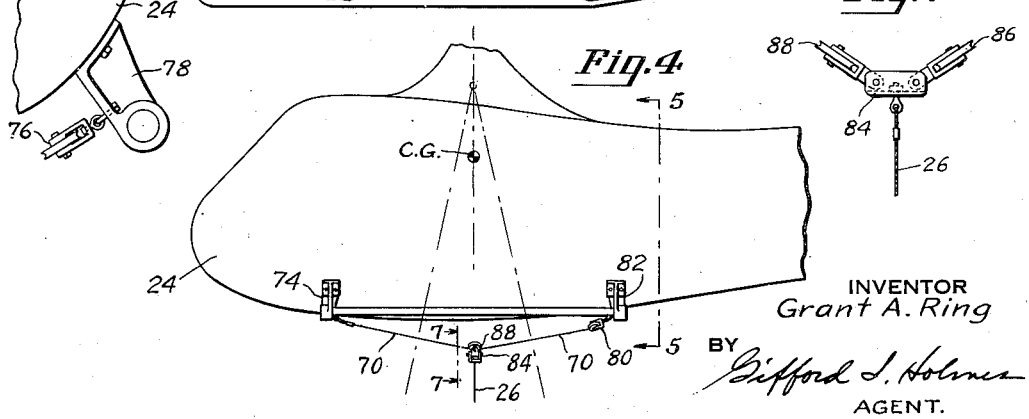
INVENTOR
Grant A. Ring
BY
Gifford J. Holmes
AGENT.

May 31, 1949.  G. A. RING  2,471,544
MEANS FOR CONNECTING MOORING CABLES
TO ROTARY WINGED AIRCRAFT
Filed March 30, 1945  3 Sheets-Sheet 2
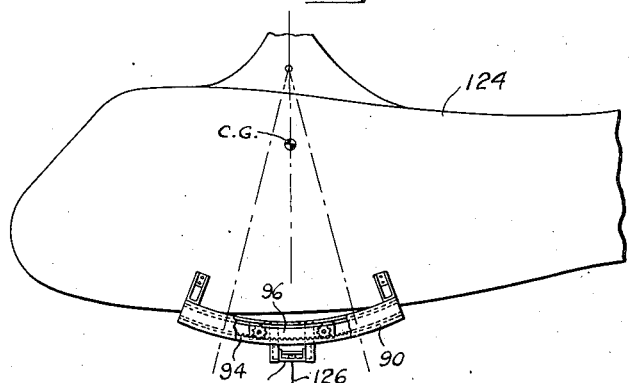
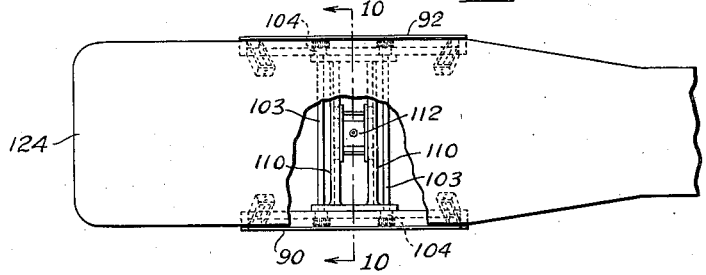
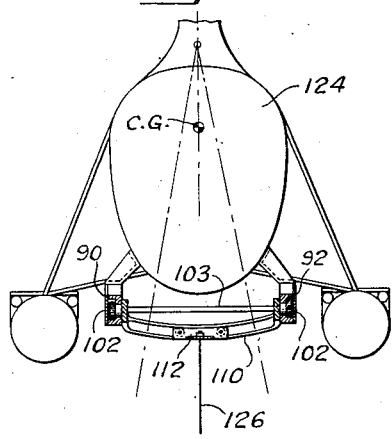
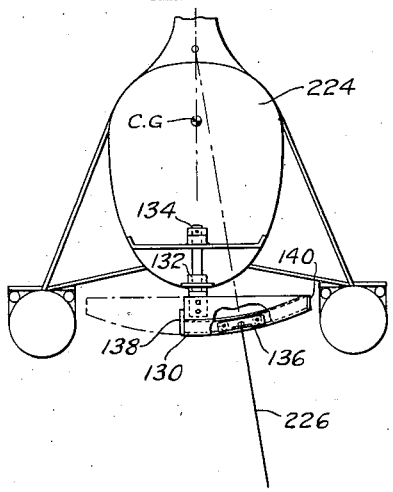
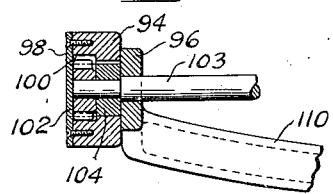
INVENTOR
Grant A. Ring
BY
*Gifford S. Holmes*
AGENT.

May 31, 1949.　　　　G. A. RING　　　　2,471,544
MEANS FOR CONNECTING MOORING CABLES
TO ROTARY WINGED AIRCRAFT
Filed March 30, 1945　　　　3 Sheets-Sheet 3
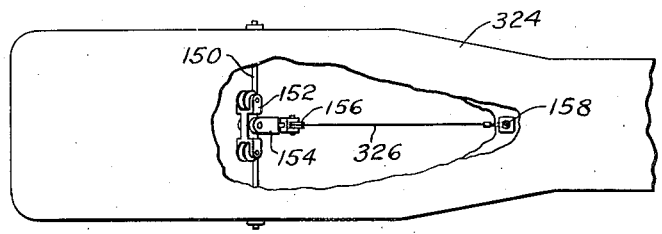
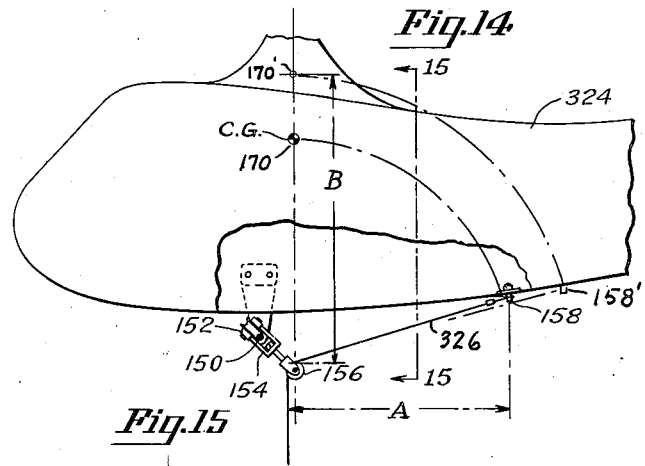
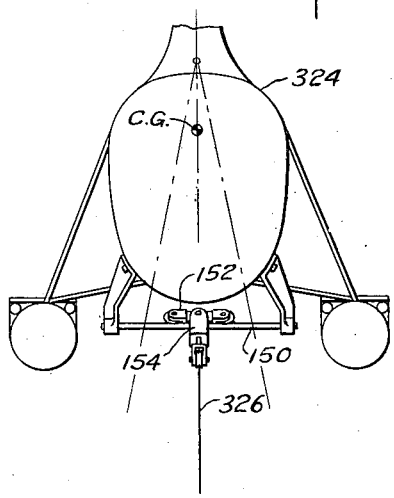
INVENTOR
Grant A. Ring
BY
Gifford J. Holmes
AGENT.

Patented May 31, 1949

2,471,544

UNITED STATES PATENT OFFICE 2,471,544

MEANS FOR CONNECTING MOORING CABLES TO ROTARY WINGED AIRCRAFT

Grant A. Ring, West Hartford, Conn., assignor to United Aircraft Corporation, East Hartford, Conn., a corporation of Delaware Application March 30, 1945, Serial No. 585,611

3 Claims. (Cl. 244—115)

The present invention relates to helicopters, and more particularly to a method and means associated with helicopters for mooring and landing the same.

In operating a helicopter from the deck of a ship, it has been found that the pitching and rolling movements of the ship relative to the helicopter may be such as to cause landing to become difficult or dangerous. If such relative motion is great at the moment landing is effected, the forces resulting therefrom may produce destructive stresses in the helicopter.

It is, therefore, an object of this invention to provide improved landing methods and means for helicopters, including a cable or the like attached to the helicopter and extending therefrom to a mooring mechanism on the landing platform.

If such an attachment cable were secured to a helicopter at a fixed point substantially below the center of gravity thereof, the moment produced by the tension in the cable when the latter is displaced from the vertical would tend to increase the initial displacement and thereby produce instability.

Accordingly, another object of this invention is to provide means for stabilizing direct-lift aircraft while moored to a landing platform.

Another object is to provide cable attachment means to such aircraft for providing an effective position of application of force substantially at or above the center of gravity of the helicopter.

The foregoing, and other objects, will be obvious or pointed out in the following specification and claims.

In the drawings:

Fig. 1 is a diagrammatic view showing one application of my invention;

Fig. 2 is a diagrammatic view showing a mooring mechanism including a winch, damper, and cooperating structure;

Figs. 3, 4 and 5 are plan, elevation and sectional views of one form of the invention;

Figs. 6 and 7 are detail views thereof;

Figs. 8, 9 and 10 are elevation, plan, and sectional views of another form of the invention;

Fig. 11 is a detail view of the gear track thereof;

Fig. 12 is a sectional view showing another form of the invention; and

Figs. 13, 14 and 15 are plan, elevation and sectional views of another form of the invention.

Referring to the drawings in Fig. 1, a ship 20 is provided with an afterdeck 22 upon which a helicopter 24 can be brought to rest. A cable 26 is shown as extending between the deck 22 and the helicopter 24. The cable 26 may be lowered by means 25 from the helicopter as it prepares to land upon the deck, fastened by a clip 27 to a cable 29 secured to a winch, to be described hereinafter, that can pull the helicopter down to the deck 22 against the lift of the helicopter rotor.

In Fig. 2, the mooring mechanism is shown diagrammatically. The cables 26 and 29 pass through a hole 28 in the deck 22 and through a series of fixed pulleys 30, 32 and 33, through pulleys 36, 38, 40, 42 and 44, carried by damping cylinders 53, 54, 56, 58 and 60, over a fixed pulley 46 to a winch 48. The winch 48 is driven by a motor 50 through a gear box 52.

The damping cylinders 53, 54, 56, 58 and 60 are connected to a supply pipe 62 which in turn is connected to a fluid storage pressure tank 64. The pressure is maintained in the tank 64 by a pump-motor combination 66 which is shown as being electrically driven under control of a pressure switch 68. The details of construction of the switch and motor are not deemed to be necessary because they could be of any other of several conventional forms and operate only to maintain a substantially constant predetermined pressure in the tank 64.

Mechanism for securing the cable 26 to the helicopter 24 is shown in Figs. 3 to 7. The structure herein illustrated comprises a guide cable 70 secured to brackets 72 and 74 which brackets may be the mounting brackets for the landing gear of the helicopter 24. The cable 70 passes from the bracket 72 through a pulley 76 carried by a bracket 78 and a pulley 80 carried by another bracket 82 and to the bracket 74. As the device is thus assembled, the cable 70 will hang loosely. A cable connection is mounted upon a carriage 84 having universally mounted pulleys 86 and 88. As best shown in Fig. 4, the force exerted by the landing cable 26 causes the cable 70 to extend downwardly from the body of the helicopter 24. As shown in Fig. 3, the cable 70 is pinched inwardly on each of its longest sides. As the cable carriage 84 is moved forward and backward with respect to the aircraft, the shape of the geometric figure outlined by the cable 70 will be changed. As the cable carriage 84 moves sideways with respect to the helicopter body 24, one leg of the cable 70 will be shortened and the other leg lengthened.

The cable 70 is arranged with respect to the pulleys 86 and 88 on the carrier 84 and the pulleys 76 and 80 on the brackets 78 and 82 so that as the carriage 84 is moved back and forth and sideways with respect to the body of the helicopter 24 the line of force exerted by the landing cable 26 with respect to the body of the aircraft will pass through the aircraft at substantially a point above the center of gravity thereof. Thus, as the ship 20 or the helicopter 24 rolls or pitches, the angle of the cable with respect to the helicopter body 24 will change and the force exerted by the cable 26 upon the helicopter will be in a direction to roll it to some extent around its center of gravity. Because the direction of application of force in my invention passes above the center of gravity, the component tending to roll the aircraft will be such as to cause tilting of the aircraft so that it will move toward a position in which the direction of the cable will be vertical. It will be noted that when the aircraft is well above the deck of the ship, the angle due to rolling and pitching movements of the ship will be small and the corrections will not be pronounced. However, as the helicopter approaches to the deck 22, the angle will be greater for a given rolling or pitching movement. Thus, the action of the attachment cable 70 upon the helicopter will be to provide stability thereto while performing the function of mooring it.

In the normal operation of my device, the helicopter 24 flies over the afterdeck 22 of the ship 20. When the speed of the helicopter 24 is the same as the speed of the ship, and the relative position of the two is substantially that shown in Fig. 1, the pilot will operate the means 25 lowering the cable 26 to the deck. Enough cable will be payed out so that there is slack therein. The deck hands will fasten the cable 26 to the cable 29 by the fastening means 27. After the cable is fastened, the pilot may slowly lift the helicopter 24, or operate the mechanism 25, or the deck hands can operate the winch mechanism to take the slack out of the cable. If the sea is rough and the boat is pitching, a severe shock to the helicopter might be imparted through the cable if the cable were drawn taut through a solid connection. Some ships have been known to pitch as much as twenty to thirty feet, for example, at a frequency of several times per minute. However, the dampers 53, 54, 56, 58 and 60 will absorb such a shock because the number of dampers will permit a large relative movement between the deck 22 and the helicopter 24. Because of the damping action of the dampers, the oscillations of the deck 22 with the helicopter 24 will be brought into phase. The deck hands will then operate the control mechanism 51 to overcome the lift of the rotor to pull down the helicopter 24 into engagement with the deck 22.

In Figs. 8 to 11 inclusive, I have shown another form of my invention for obtaining a virtual point of attachment at or above the center of gravity of a helicopter. The device comprises a pair of parallel curved tracks 90 and 92 disposed substantially on opposite sides of the body of the helicopter 124. The curvature of the tracks is such that the line of force exerted normal to the track will pass through the craft at a position above the center of gravity thereof. The tracks 90 and 92 are provided with teeth 94 so that the carriage 96 will not become skewed as it rolls along the arcuate track. As shown in Fig. 11, the track 94 is provided with a cover plate 98 and has a groove 100 in which a pinion 102 may move. The pinion 102 is connected to a shaft 103 carried by a bearing 104 which shaft connects to a similar pinion in a groove in the track 92. The carriage 96 connects to a pair of tracks 110 which are curved similarly to the curve of the tracks 90 and 92. These tracks may also be toothed if desired. A cable connection carriage 112 is adapted to move in the tracks 110 so that the cable 126 attached thereto can be moved laterally with respect to the body of the helicopter 124 as well as back and forth with respect thereto.

It will be obvious that the modification disclosed in Figs. 8 to 11 will function in substantially the same manner as pointed out in connection with that modification hereinbefore described, and hence a detailed explantion of its function will not be presented. However, it will be understood that this latter modification also provides means for making a stable connection to a helicopter or the like by a mooring cable.

Fig. 12 shows a further modification of my invention. The device herein shown comprises a swivel member 130 mounted in pivots 132 and 134 connected to the helicopter 224. The member 130 can rotate through 360 degrees. A carriage 136 is mounted in a curved track formed in the member 130. The track is so arranged that the center of curvature thereof lies above the center of gravity of the helicopter 224. A stop 138 is provided at the lower part of the curved track so that the carriage 136 cannot place the mooring cable 226 in the dead center position. A stop 140 is provided at the other end of the curved track to prevent the carriage 136 from running out of the track. It will be understood that the device disclosed in Fig. 12 will operate the same as the other devices disclosed and maintain the virtual point of support above the center of gravity of the helicopter 224 to afford a stable connection between the helicopter and a mooring cable.

Figs. 13 through 15 disclose another modification of my invention. In this modification, a bar 150 is attached beneath the helicopter 324. The carriage 152 is adapted to roll upon the bar 150. A swivel link 154 carries a pulley 156 through which the mooring cable 326 passes. The cable 326 is secured to the bottom of the craft upon a pivot 158. The arrangement shown in these figures is such that connection to the craft is made in a simple manner and the point of virtual support 170 may be easily adjusted by changing the position of the pivot 158.

As shown in solid lines, the point of virtual support 170 coincides with the center of gravity of the craft; and stability is neutral. By moving the pivot 158 to the dotted position 158', the virtual point of support will occur at 170' above the center of gravity; and stability will be positive. In some cases, it may be desirable to place the point of virtual support somewhat below the center of gravity, and such arrangement is desired to be within the scope of the invention.

While I have shown different forms of my invention, it is obvious that other forms hereof will occur to those skilled in the art. For example, it would be obvious to rearrange different parts shown in different modifications of my invention to obtain substantially the same result. It is also conceivable that different types of aircraft than helicopters could use a type of mooring system such as I have disclosed. Hence I do not want to be limited in my invention only to those forms shown and described but by the scope of the following claims.

I claim:

1. Means for connecting a mooring or landing cable to rotary winged aircraft comprising in combination, a guide cable secured to said aircraft at two points spaced laterally from a vertical line passing through the center of gravity thereof, a pair of pulleys also secured to said aircraft for guiding said guide cable, said pulleys being spaced from said points and lying on the opposite side of the vertical line, said guide cable being longer than a line passing from one of said points through said pulleys and back to the other of said points, and a landing cable carriage mounted upon said guide cable at a pair of points lying between said pulleys and said points.

2. Means for connecting a mooring cable to a rotary winged aircraft comprising in combination, a guide cable anchored at its ends to the aircraft at points spaced laterally from a vertical line passing through the center of gravity thereof, a pair of cable supports also secured to said aircraft through which said guide cable is adapted to pass, said supports being spaced from said anchor points and lying on the opposite side of the vertical line, said guide cable being longer than the straightline distances from one of said anchor points through said supports and back to the other anchor point, and a landing cable carriage mounted upon said guide cable between said anchor points and said supports.

3. Means for connecting a mooring cable to a rotary winged aircraft comprising in combination, a guide cable anchored at its ends to the aircraft at points spaced laterally from a vertical line passing through the center of gravity thereof, a pair of cable supports also secured to said aircraft through which said guide cable is adapted to pass, said supports being spaced from said anchor points and lying on the opposite side of the vertical line, said guide cable being longer than the straightline distances from one of said anchor points through said supports and back to the other anchor point, and a landing cable carriage mounted upon said guide cable between said anchor points and said supports and having a pair of relatively closely spaced cable supports through which the reaches of said guide cable adjacent its ends are passed, the spacing of said carriage carried cable supports being such as to substantially take up the slack in said guide cable.

GRANT A. RING.

REFERENCES CITED

The following references are of record in the file of this patent:

UNITED STATES PATENTS

| Number | Name | Date |
|---|---|---|
| 1,302,007 | Calthrop | Apr. 29, 1919 |
| 2,181,477 | Chupp | Nov. 28, 1939 |
| 2,429,502 | Young | Oct. 21, 1947 |
| 2,453,857 | Platt | Nov. 16, 1948 |

FOREIGN PATENTS

| Number | Country | Date |
|---|---|---|
| 18,773 | Great Britain | Aug. 8, 1896 |
| 227,244 | Germany | Oct. 17, 1910 |
| 496,502 | Great Britain | Dec. 1, 1938 |
| 573,091 | Germany | Mar. 27, 1933 |